(12) United States Patent
Bansal et al.

(10) Patent No.: US 11,934,974 B2
(45) Date of Patent: Mar. 19, 2024

(54) INTELLIGENT INTEGRATED REMOTE REPORTING SYSTEM

(71) Applicant: Bank of America Corporation, Charlotte, NC (US)

(72) Inventors: Gaurav Bansal, Telangana (IN); Nikhil Pathak, Uttar Pradesh (IN); Raja Venkatesh Gottumukkala, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 329 days.

(21) Appl. No.: 17/494,116

(22) Filed: Oct. 5, 2021

(65) Prior Publication Data

US 2023/0116238 A1   Apr. 13, 2023

(51) Int. Cl.
| | | |
|---|---|---|
| *G10L 15/18* | (2013.01) |
| *G06N 20/20* | (2019.01) |
| *G06Q 10/063* | (2023.01) |
| *G10L 15/22* | (2006.01) |

(52) U.S. Cl.
CPC ........... *G06Q 10/063* (2013.01); *G06N 20/20* (2019.01); *G10L 15/18* (2013.01); *G10L 15/22* (2013.01); *G10L 2015/223* (2013.01)

(58) Field of Classification Search
CPC .. G06Q 30/01; G06Q 10/063; G06Q 10/0633; G06Q 30/0255; G06Q 30/0201; G06N 20/20; G06F 16/2428; G06F 16/243; G06F 16/951; G06F 16/242; G06F 16/284; G06F 16/288; G10L 15/18; G10L 15/22; G10L 2015/223
See application file for complete search history.

(56) References Cited

U.S. PATENT DOCUMENTS

| | | | | |
|---|---|---|---|---|
| 10,254,945 | B1* | 4/2019 | Gupta | H04L 67/306 |
| 11,100,400 | B2* | 8/2021 | Fang | G06N 3/084 |
| 11,158,016 | B2* | 10/2021 | Varga | G06Q 50/2057 |
| 11,423,281 | B2* | 8/2022 | De Magalhaes | G06N 20/00 |
| 11,720,595 | B2* | 8/2023 | Zheng | G06F 16/244 |
| | | | | 707/705 |
| 11,797,824 | B2* | 10/2023 | Perez Rua | G06N 3/084 |
| 2015/0100946 | A1* | 4/2015 | Brunswig | G06F 11/3688 |
| | | | | 717/124 |
| 2016/0232457 | A1* | 8/2016 | Gray | G06F 16/26 |

(Continued)

Primary Examiner — Jakieda R Jackson
(74) Attorney, Agent, or Firm — Weiss & Arons LLP

(57) ABSTRACT

Systems, methods, and apparatus are provided for intelligent, integrated, and interactive remote reporting. A remote natural language request for a report may be received from a user at an edge device. A first machine learning model may generate a list of existing reports based on past usage by the user. If no existing report satisfies the request, a second, enterprise-level machine learning model may map the request to relevant data sets and rank the mapped data sets along with additional related data sets based on enterprise-wide usage. An integrated reporting platform may receive selected data sets and report parameters as a JSON request, convert the request to compatible executable instructions, and generate the report. The integrated reporting platform may be a wrapper layer encompassing multiple proprietary reporting engines. Feedback from the integrated reporting platform may be applied to update the machine learning models.

18 Claims, 5 Drawing Sheets

(56) References Cited

U.S. PATENT DOCUMENTS

| | | | |
|---|---|---|---|
| 2017/0097940 A1* | 4/2017 | Panuganty | G06F 16/90324 |
| 2017/0126695 A1* | 5/2017 | Nassar | G06Q 30/02 |
| 2017/0264608 A1* | 9/2017 | Moore | G07C 9/257 |
| 2017/0277691 A1* | 9/2017 | Agarwal | H04L 67/306 |
| 2017/0286803 A1* | 10/2017 | Singh | G06F 18/2178 |
| 2017/0289650 A1* | 10/2017 | Schattmaier | G06N 5/046 |
| 2017/0364673 A1* | 12/2017 | Gupta | G06F 21/36 |
| 2018/0285777 A1* | 10/2018 | Li | G06Q 10/02 |
| 2019/0036776 A1* | 1/2019 | Smith | H04L 41/28 |
| 2019/0327271 A1* | 10/2019 | Saxena | G06F 8/38 |
| 2019/0347953 A1* | 11/2019 | Won | G16H 20/70 |
| 2019/0370750 A1* | 12/2019 | Punzalan | G06V 30/416 |
| 2020/0029050 A1* | 1/2020 | Antunes | H04R 1/08 |
| 2021/0149886 A1* | 5/2021 | Zheng | G06N 5/02 |
| 2021/0271956 A1* | 9/2021 | Wang | G06F 18/217 |
| 2022/0004571 A1* | 1/2022 | Ganapathy | G06F 16/3326 |
| 2022/0092028 A1* | 3/2022 | Layton | G06F 16/284 |
| 2022/0207506 A1* | 6/2022 | Daruna | G06Q 20/40 |
| 2022/0309286 A1* | 9/2022 | Freese | G06F 18/10 |
| 2022/0313077 A1* | 10/2022 | Singh | G06V 10/143 |
| 2023/0308303 A1* | 9/2023 | Jorasch | H04L 65/1093 |
| | | | 709/204 |

* cited by examiner

INTELLIGENT INTEGRATED REMOTE REPORTING SYSTEM

FIELD OF TECHNOLOGY

Aspects of the disclosure relate to interactive report generation using smart glasses technology.

BACKGROUND OF THE DISCLOSURE

Financial institution clients or financial advisors may require reporting information while away from their systems, such as while traveling or participating in meetings.

It would be desirable for a system to enable access to reporting information via remote voice access. Illustrative voice communication options include voice-enabled smart glasses communication and telephone communication.

Smart glasses may be defined as wearable glasses that include both hardware and software components. Smart glasses may adopt the structure of a conventional pair of eyeglasses with a frame and lenses. A microprocessor may be embedded within the glasses and may provide processing capabilities.

It would be desirable for the system to operate interactively to identify the desired reporting data and generate a customized report. It would be desirable to use edge computing architecture to reduce latency and provide real-time interactions by telephone, at a smart glasses interface or at a mobile device.

It would be desirable for the system to use machine learning to locate relevant data sets based on the user request, user history, and relationships between data sets. It would be desirable for the system to be entirely integrated seamlessly generate reports regardless of the data structures for each of the relevant data sets.

SUMMARY OF THE DISCLOSURE

Systems, methods, and apparatus for intelligent, integrated, and interactive remote reporting are provided.

A remote natural language request for a report may be received from a user at an edge device. A first machine learning model may generate a ranking of existing reports based on past access by the user. The edge device may display the reports to the user and receive user input.

When an existing report satisfies the user request, the edge device may receive input from the user selecting reporting data and report parameters. The selections may be transmitted to an integrated reporting platform in JSON format.

When none of the existing reports satisfy the request, an interactive report generation module may generate a new report. A second, enterprise-level machine learning model may map the request to relevant data sets. The second machine learning model may rank the mapped data sets along with additional related data sets, based on enterprise-wide usage.

The user may select ranked data sets and report parameters at the edge device. The selected data sets and report parameters may be transmitted to the integrated reporting platform as a JSON request.

The integrated reporting platform may convert a JSON request from the edge device or from the interactive report generation module to executable instructions in a format compatible with the relevant reporting format for the data. The integrated reporting platform may generate the report. The integrated reporting platform be a wrapper layer encompassing multiple proprietary reporting engines.

Feedback from the edge device and the integrated reporting platform may be used to update the machine learning models.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
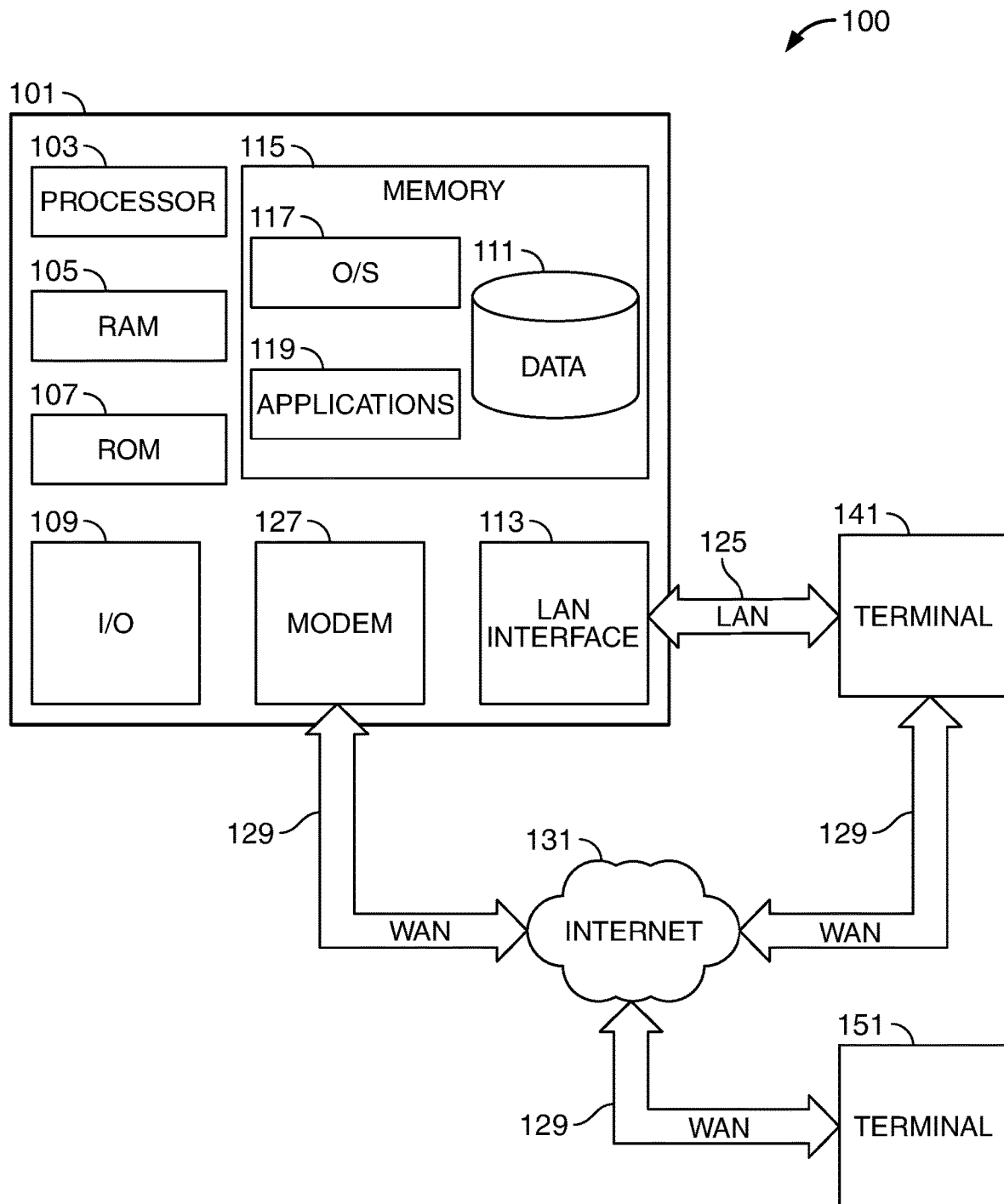
FIG. 1 shows illustrative apparatus in accordance with principles of the disclosure.

Systems, methods, and apparatus for intelligent, interactive, and integrated remote reporting are provided.

For the sake of illustration, the invention may be described as being performed by a "system." The system may include one or more features of apparatus and methods that are described herein and/or any other suitable device or approach.

Illustrative system users may include financial institution clients and financial institution advisors. Users may be away from their workstations and unable to access enterprise reports through the usual protocols.

The integrated remote reporting system may be interactive. The user may communicate with the system via a smart glasses device, a mobile banking application, a telephone call, a web browser, or any other suitable communication method.

The system may include wearable smart glasses. The smart glasses may be structured with a frame and lenses. The frame and/or lenses may include embedded or partially embedded hardware and software components.

The smart glasses may include one or more microprocessors. The smart glasses may include one or more software applications. The applications may enable the smart glasses to execute various tasks. One or more of the software applications may be executed on the processors. Software applications may be stored in a memory embedded in the smart glasses.

The smart glasses may include one or more displays. In some embodiments, a smart glasses display may add data alongside the view through the lenses using augmented reality technology. A display controller may be configured to display data as a semi-transparent overlay appearing on the lenses. Augmented reality displays may be achieved through curved mirror techniques. Alternative techniques include waveguide-based technology such as a virtual retinal display.

The smart glasses may include one or more communication transceivers. The communication transceivers may be operable to communicate with an external processor. The external processor may be located within a mobile device or any other suitable computing device.

The smart glasses may include a nano wireless network interface card ("NIC"). The nano wireless NIC may provide the smart glasses with a dedicated, full-time connection to a wireless network. The nano wireless NIC may implement the physical layer circuitry necessary for communicating with a data link layer standard, such as Wi-Fi. The nano wireless NIC may support input/output ("I/O"), interrupt, direct memory access, interfaces, data transmission, network traffic engineering and/or partitioning.

The smart glasses may include a wireless controller application. The wireless controller application may be configured to interface between the NIC and an external Wi-Fi device. The wireless controller application may be configured to transmit data collected by the smart glasses over the wireless network.

The smart glasses may include one or more cameras for capturing images and/or videos, one or more audio input devices, and one or more audio output devices.

Smart glasses inputs from a user may be hands-on. Smart glasses inputs from a user may be hands-free. In some embodiments, smart glasses inputs may involve a combination of hands-on and hands-free protocols.

In some embodiments, the smart glasses inputs may be hands-on. The smart glasses may require the use of touch buttons on the frame. In some embodiments, the user input may also be entered via a nano touch screen incorporated into the frame or lenses of the smart glasses.

In some embodiments, the smart glasses inputs may be hands-free. The smart glasses may receive hands-free input through voice commands, gesture recognition, eye tracking or any other suitable method. Gesture recognition may include air-based hand and/or body gestures. Air-based gestures may be performed without touching the smart glasses.

After the user initiates communication with the intelligent integrated remote reporting system, the user may be authenticated by the system. Illustrative authentication protocols may include a passcode or a biometric input.

In some embodiments, the system may leverage existing relationships with the financial institution for authentication. The system may authenticate a financial institution client or financial advisor with the same protocols or inputs that would be used for direct login to the financial institution system. The login may be an employee login or an account holder login.

If the user accesses the intelligent remote reporting system via smart glasses, the authentication may be received as an input to the smart glasses. In some embodiments, the smart glasses may be voice-enabled, and the system may authenticate the user via voiceprint analysis or voice-based input of a passcode. The system may authenticate the user via a touch-based input to the smart glasses, an air-based gesture, any combination of voice, touch and air gestures, iris recognition, fingerprint recognition, or by any suitable method. In some embodiments, authentication may be based on electronic communication between the smart glasses device and the system without any input by the user.

If the user accesses the intelligent remote reporting system via a mobile banking application, the user may be authenticated via protocols associated with the application. Protocols may include entry of a passcode or biometric input to the mobile application. Protocols may include device-based authentication, such as transmission of a one-time personal identification number.

If the user accesses the intelligent remote reporting system via telephone communication, the user may be authenticated via voiceprint analysis or voice-based input of an authentication code, by touchpad entry of an alphanumeric code, or by any suitable method.

Following authentication, the system may use machine learning to identify relevant existing reports for presentation to the user. Machine learning models may be mathematical algorithms trained to make assumptions about input data. Using the assumptions, a machine learning model may approximate properties of the input information to calculate new properties or determine how to respond.

Machine learning models may include regression, classification, cluster analysis or any suitable machine learning algorithms. In some embodiments, a machine learning model may incorporate multiple machine learning algorithms. The multiple algorithms may be applied selectively or may be applied in sequence.

The system may include a mapper module. The mapper module may identify existing reports that are available to the user. The mapper module may include separate machine learning models for different categories of users.

The mapper module may include a first machine learning model. The first machine learning model may be configured for financial institution clients. The first machine learning model may rank the available existing reports based on past use by the client. The ranking may result in a recommendation customized to the client.

The mapper module may include a second machine learning model. The second machine learning model may be configured for financial advisors. Because financial advisors typically have access to many more reports than do individual clients, the second machine learning model may be configured to accept more input parameters than the first machine learning model. For example, financial advisor reports may be categorized by business group, demographic group, client group, individual client names, or using any suitable groupings.

The first and second machine learning models may be user specific. The models may be trained with past data related to report access by individual users. A reporting engine may record database interactions for each system user. Feedback may also be gathered from enterprise platforms such as analytics or business intelligence platforms.

The reporting engine may include data processing, data integration and statistics compilation. Pattern matching and data cleaning may be applied to standardize the user data. The processed user data may be entered as input to train the machine learning models.

A client machine learning model may be designed to rank existing reports for individual clients based on their personal data. A financial adviser machine learning model may be designed to rank existing reports for the financial advisor based on their personal data. Because financial advisors may have access to reports for all of their clients, the model may use algorithms such as clustering to group data. Clustering may generate vectors based on factors such as client assets under management, client age, client demographics, business units, or any suitable factors.

The mapper module may be an edge computing unit. Edge computing is a distributed, open IT architecture that features decentralized processing power. Data may be processed by a local computer or server rather than being transmitted to a data center, reducing internet bandwidth usage.

The user smart glasses or user mobile device may function as an edge device. Edge computing may enable real-time processing of input data with reduced latency and may allow the devices to quickly present the user with a set of existing reports.

The edge devices may store a copy of the first machine learning model and/or the second machine learning model. In some embodiments, the machine learning models may be stored on an edge platform that is accessed by the user smart glasses or mobile device. In some embodiments, the machine learning models may be stored on an enterprise system instead of an edge device.

The first machine learning model and the second machine learning model may be updated based on feedback from the user. The machine learning models may be updated based on feedback from the integrated remote reporting system. The machine learning models may be trained and updated at an enterprise server. Updated versions of the machine learning models may be transmitted to the edge devices on a periodic basis.

The mapper module may present the user with a ranked list of reports. Reports may be ranked based on past data access by the user. The ranking may be based in part on frequency of access.

The user may interact with the system to select an existing report from the list. The use may interact with the system to specify custom parameters for the report. For example, the user may select a reporting time period, such as a quarterly or annual report, or select a specific date range. The user may select a report format such as PDF or spreadsheet formats. The user may select a level of aggregation for the report, such as summary or detailed formats. These interactions enable the system to remotely generate a customized report for the user. The finalized report may be generated using an integrated reporting platform as described below.

The list of existing reports generated by the mapper module may be presented using a smart glasses display. The user may interact with the smart glasses via voice-based, touch-based, or air-based inputs to select reports and specify parameters.

The list of existing reports generated by the mapper module may be presented using a mobile banking application. The user may interact with the application via voice-based or touch-based inputs to select reports and specify parameters for the report.

The list of existing reports generated by the mapper module may be presented as an audio message via telephone communication. The user may select a report or specify parameters via voice-based input or telephone touch buttons.

The list of existing reports generated by the mapper module may be transmitted via email. The email may include hypertext links, check boxes, radio buttons or any suitable method for providing user input.

In some cases, the desired data may not already be packaged in an existing report. User interactions with the mapper module may indicate that none of the ranked reports satisfy the user request. An interactive report generation module may enable the user to obtain an entirely customized report.

The user may communicate with the interactive report generation module using natural language. A natural language processing (NLP) engine may parse the request for mapping onto existing data sets. For example, the user might say "I want a report on capital gains tax for financial year 2019 with tax exemptions." In this example, the system may map the request to a client tax liability data set.

The interactive report generation module may include a third machine learning model. The third machine learning model may be an enterprise-level model. The third machine learning model may access past data usage by an enterprise-wide set of financial institution clients. The third machine learning model may access past data usage by an enterprise-wide set of financial advisors.

The third machine learning model may prioritize and rank the mapped data sets based on past usage by an individual user or by any relevant set of users. The third machine learning model may analyze relationships between columns and data sets, accessibility of the data, and frequency of access. The third machine learning model may recommend additional data sets based on predicted relevance. The third machine learning model may generate a ranking for the data sets.

The third machine learning model may use deep learning. Deep learning is a subset of machine-learning. Deep learning classifiers are input during a training stage as labeled training data. Deep learning uses the classifiers to learn from the input data and uses the learned information to correctly classify unlabeled data during execution. A deep learning classifier creates, absent human interaction, a non-linear, multi-dimensional classification model based on the labeled-training data.

Deep learning classifiers typically utilize a layered structure of algorithms known as an artificial neural network ("ANN") to create the non-linear, multi-dimensional classification model. An ANN mimics the biological neural network of the human brain. The ANN is comprised of layers of neurons. Each neuron, included in each layer, takes one or more inputs and produces one output. The output is based on the values of the inputs as well as a weight associated with each inputted value. As such, one input can carry more weight than another input.

The system may present the ranked data sets to the user. The ranked data sets may be presented at a smart glasses display or a mobile application. The ranked data sets may be presented via telephone. In some embodiments, the ranked data sets may be transmitted to the user by email.

The user may provide input based on the presented data. The user may provide input using natural language or using any suitable method. The user may provide input selecting from the recommended data sets. The user may provide input specifying report parameters. The user may provide input rejecting the options and making a new request.

Based on the inputs from the user, the system may generate a final list of report schema such as columns, input parameters, delivery method, level of aggregation, format, etc. The system may generate a mock or simulated report. The mock report may include the report structure. The mock report may be configured for the selected data sets, but may not be populated with the data. The mock report may be populated with simulated data.

The system may obtain approval of the mock report from the user. The system may transmit the mock report to the user for verification. The mock report may be presented using a smart glasses display or a mobile application. In some embodiments, the mock report may be transmitted to the user by email. The user may approve the mock report format and projected content. The user may request modifications to the mock report. The system may generate a new mock report based on the user modifications.

The system may include an integrated reporting platform. After the user has approved an existing report presented by the mapper module or a mock report generated by the interactive report generation module, the integrated reporting platform may retrieve the data and generate the requested report.

The integrated reporting platform may generate reports from data maintained in different technical systems. Data warehouses and proprietary reporting engines may store reporting data in a variety of different data structures. The integrated reporting platform may seamlessly generate reports irrespective of the underlying technology.

The integrated reporting platform may be a wrapper layer which hides multiple reporting engines within. Illustrative reporting engines may include SQL Server™, a product of Microsoft Corporation; Oracle Reports™, a product of Oracle Corporation; Tableau™, a product of Tableau Software, LLC, MicroStrategy™, a product of MicroStrategy Incorporated; and Cognos Analytics™, a product of International Business Machines Corporation.

The report request may be received from the mapper module or from the interactive reporting module in JavaScript Object Notation (JSON) format or in any suitable language. JSON is a data interchange format that uses human-readable text to store and transmit data objects.

The integrated reporting platform may convert the JSON request to executable instructions compatible with the relevant reporting engine. The integrated reporting platform may access the selected data sets and assemble the custom report. The system may transmit the custom report to the user smart glasses or mobile application. In some embodiments, the system may transmit the custom report to the user via email. The system may display the custom report to the user.

The efficiency and accuracy of the machine learning models may improve over time. Data associated with selection and generation of the report may be transmitted to the enterprise system to update and tune the models for future use. Feedback may include data regarding relevance of the listed reports and/or data sets. Feedback may include data regarding the accuracy of the ranking. Report metadata and usage data may also be sent as feedback.

One or more non-transitory computer-readable media storing computer-executable instructions are provided. When executed by a processor on a computer system, the instructions perform a method for intelligent, interactive, and integrated remote reporting.

The method may include receiving a natural language request from a user for remote generation of a report at an edge device. The method may include, using a first machine learning model installed on the edge device, generating a ranked set of existing reports. The ranking may be based at least in part on past database usage by the user.

The method may include receiving an input from the user at the edge device rejecting the set of existing reports. In response to the input, the method may include, using a second machine learning model installed on an enterprise server. The second machine learning model may map the natural language request to one or more data sets and generate a ranking including the mapped data sets and one or more additional data sets. The ranking may be based at least in part on past database usage by the user, past database usage by a set of enterprise users, and/or a relationship between a mapped data set and the additional data sets.

The method may include receiving a user selection of one or more of the ranked data sets and one or more report parameters and transmitting a request to an integrated reporting platform in JSON format.

The method may include converting the JSON request to executable instructions in a format compatible with the selected data set and generating a report comprising the selected data set. The method may include transmitting feedback associated with the selected data set to update the first machine learning model and the second machine learning model.

Systems, methods, and apparatus in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with another illustrative apparatus/method embodiment.

FIG. 1 shows illustrative apparatus 100 that may be configured in accordance with the principles of the invention. FIG. 1 is a block diagram that illustrates a computing device 101 (alternatively referred to herein as a "server or computer") that may be used in accordance with the principles of the invention. The computer server 101 may have a processor 103 for controlling overall operation of the server and its associated components, including RAM 105, ROM 107, input/output ("I/O") module 109, and memory 115.

I/O module 109 may include a microphone, keypad, touchscreen and/or stylus through which a user of device 101 may provide input, and may also include one or more of a speaker for providing audio output and a video display device for providing textual, audiovisual and/or graphical output. Software may be stored within memory 115 and/or other storage (not shown) to provide instructions to processor 103 for enabling server 101 to perform various functions. For example, memory 115 may store software used by server 101, such as an operating system 117, application programs 119, and associated database 111.

Alternatively, some or all of computer executable instructions of server 101 may be embodied in hardware or firmware (not shown).

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks.

When used in a LAN networking environment, computer 101 is connected to LAN 125 through a network interface or adapter 113.

When used in a WAN networking environment, server 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Additionally, application program 119, which may be used by server 101, may include computer executable instructions for invoking user functionality related to communication, such as email, short message service (SMS), authentication services and voice input and speech recognition applications.

Computing device 101 and/or terminals 141 or 151 may also be mobile terminals including various other components, such as a battery, speaker, and antennas (not shown). Terminal 151 and/or terminal 141 may be portable devices such as a laptop, tablet, smartphone or any other suitable device for receiving, storing, transmitting and/or displaying relevant information.

Any information described above in connection with database 111, and any other suitable information, may be stored in memory 115. One or more of applications 119 may include one or more algorithms that encrypt information, process received executable instructions, interact with enterprise systems, perform power management routines or other suitable tasks. Algorithms may be used to perform the functions of one or more of training the machine learning models, recommending and ranking reports and/or data sets, interacting with a user, generating execution instructions in a format compatible with the relevant reporting engine, generating a report, and/or perform any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
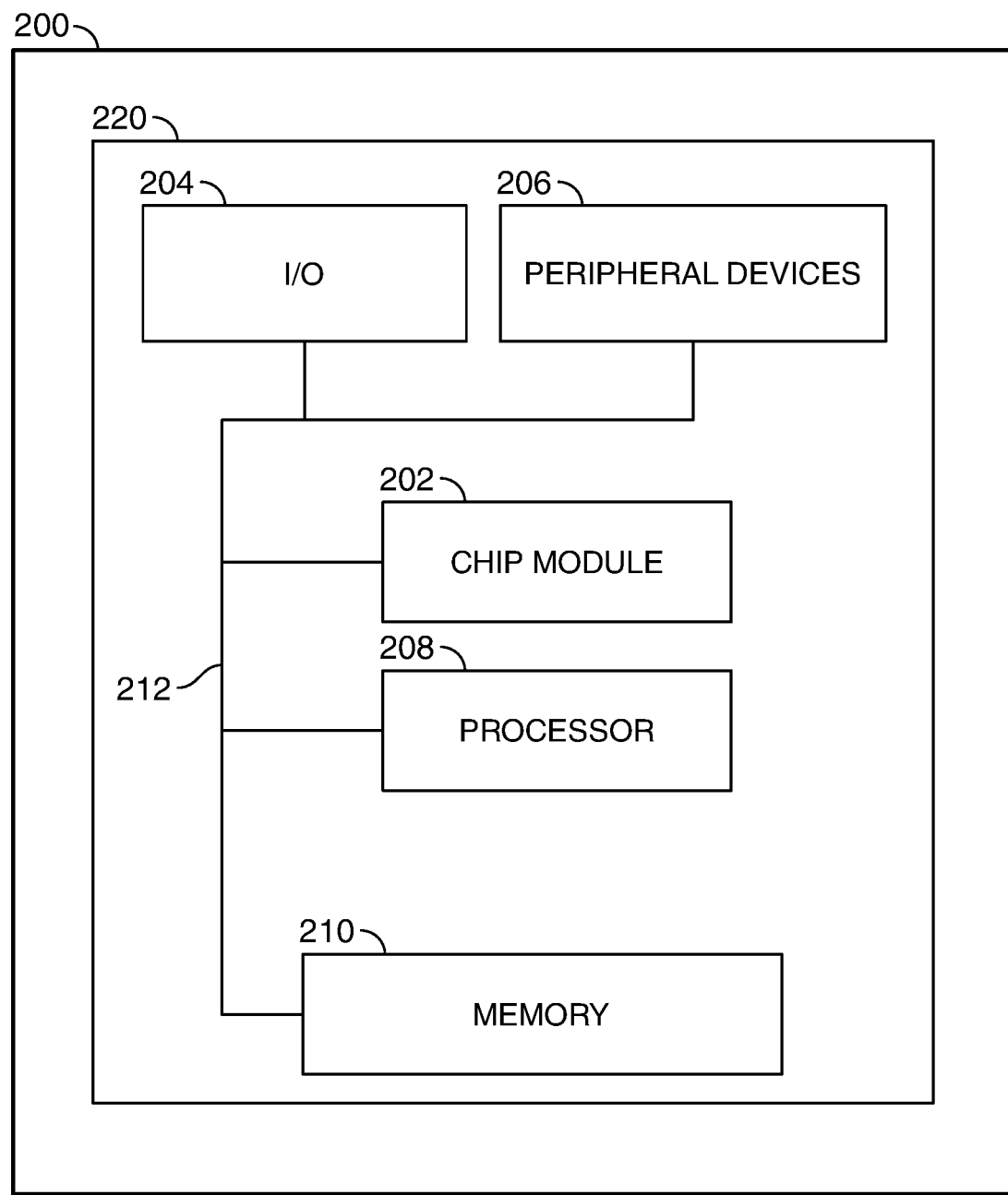
FIG. 2 shows illustrative apparatus in accordance with principles of the disclosure.

FIG. 2 shows an illustrative apparatus 200 that may be configured in accordance with the principles of the invention.

Apparatus 200 may be a computing machine. Apparatus 200 may include one or more features of apparatus 100, shown in FIG. 1.

Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may generate machine learning models, recommend and rank reports and data sets, interact with a user, generate executable instructions, generate reports, and perform other methods described herein; and machine-readable memory 210.

Machine-readable memory 210 may be configured to store in machine-readable data structures: data sets, report schema, data usage, user interactions, machine learning models, and any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
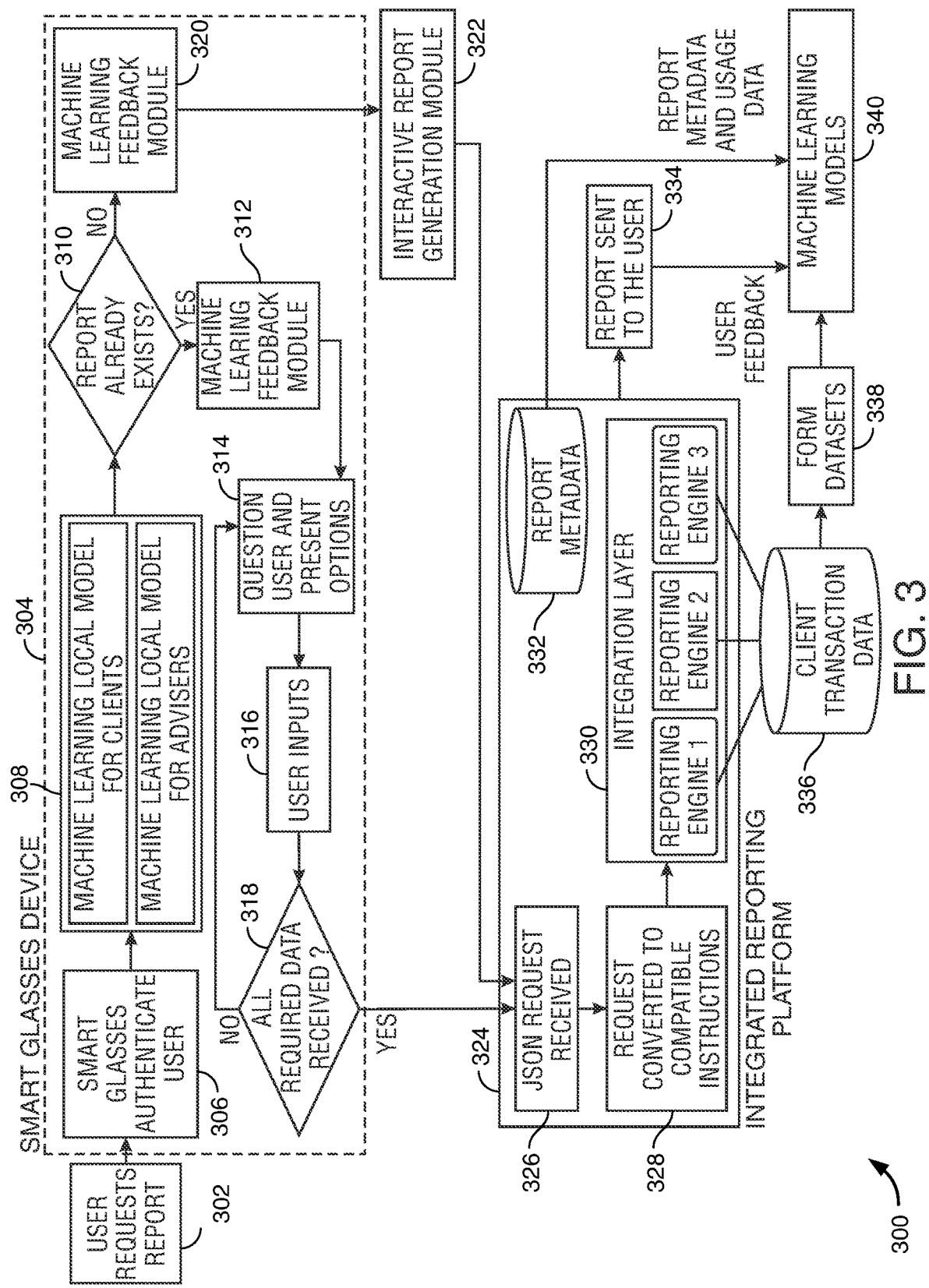
FIG. 3 shows an illustrative process flow in accordance with principles of the disclosure.

FIG. 3 shows illustrative process flow 300 for an intelligent, integrated, and interactive remote reporting system. At step 302, a user requests a report. Process flow 300 illustrates an embodiment involving smart glasses device 304.

At step 306, the smart glasses may authenticate the user. For example, the smart glasses may be voice-enabled and may authenticate a user based on a voiceprint. At step 308, a mapper module may apply a machine learning model. The machine learning model may be a personalized client-based model. The machine learning model may be personalized financial advisor-based model. The machine learning models may be installed on the smart glasses to reduce latency during user interactions through edge processing.

The mapper module may generate a ranked list of existing reports. At step 310, the smart glasses may receive user input regarding the ranked existing reports.

If an existing report satisfies the user request, the process continues with steps 312-318. At step 312, feedback is provided to the machine learning model regarding the effectiveness of the ranking. At step 314, the smart glasses may question the user and present selectable options via the smart glasses display. At step 316, the user provides input to the smart glasses. At step 318, the smart glasses may determine that all necessary input has been received. If the smart glasses determine that necessary input has not been received, the process may return to step 314.

If none of the existing reports satisfy the user request, the process may continue with steps 320-322. At step 320, feedback is provided to the machine learning model regarding the effectiveness of the ranking. At step 322 the process may continue using the interactive report generation module shown in FIG. 4.

The user inputs from the smart glasses or from the enterprise-based interactive report generation module may be transmitted to integrated reporting platform 324. The integrated reporting platform may be located on an enterprise server, in the cloud, or in any suitable location. At step 326, the request is received in JSON format. At step 328, the request is converted into execution instructions compatible with the format for the selected reporting data. Integration layer 330 is a wrapper layer that includes multiple reporting engines, each with proprietary data structures. Database 332 stores report metadata such as name, parameters, access restrictions and available versions. At step 334, the report may be generated and sent to the user.

Client transaction data may be retrieved using the integration layer and stored in database 336. At step 338, data sets may be formed from the client transaction data. At step 340, report data, report metadata, usage data, user feedback, and/or generated data sets are used to update the machine learning models shown in processes 300, 400, and 500.

Figure 4:
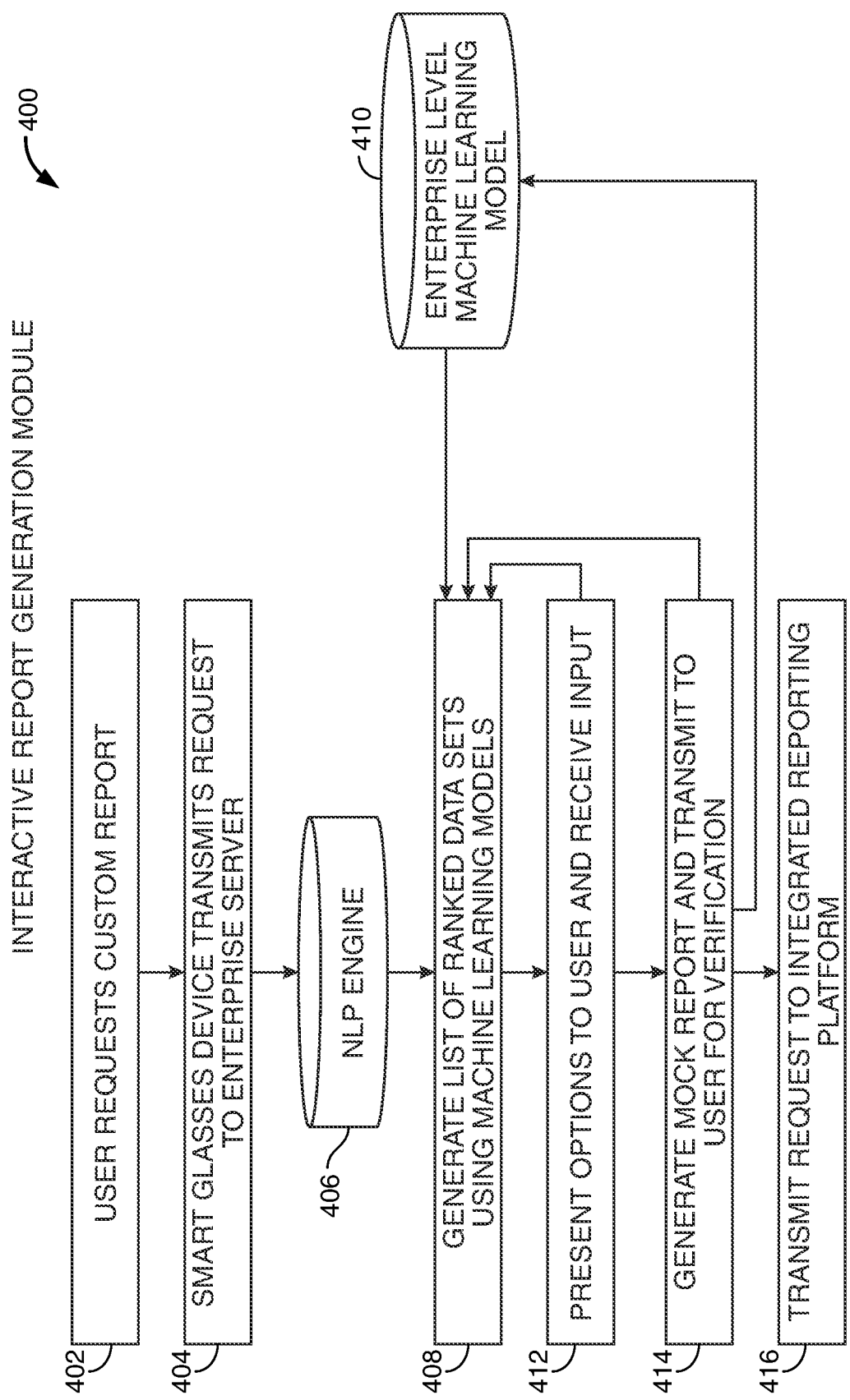
FIG. 4 shows an illustrative process flow in accordance with principles of the disclosure.

FIG. 4 shows process flow 400 for the interactive report generation module. Process flow 400 may include one or more features of process flow 300, shown in FIG. 3. The interactive report generation module is shown at step 322 of process 300.

At step 402, a user requests a report not included in the ranked list of existing reports generated in process 300. At step 404, the smart glasses transmit the request to an enterprise server. At step 406, a natural language processing engine parses the user request. At step 408, the interactive report generation module may generate a ranked list data sets using machine learning. Enterprise-level machine learning model 410 may be applied to generate the list of data sets. At step 412, the options may be presented for user input. Based on user input, the system may return to step 408 and generate a new data set ranking.

At step 414, the system may generate a mock report and transmit the mock report to the user for approval. The mock report may include selected report schema along with simulated data. Based on user feedback, the system may return to step 408. User feedback regarding the mock report content and parameters may be used to update machine learning model 410. At step 416, a request for the custom report may be transmitted to the integrated reporting platform shown at 324 in process 300.

Figure 5:
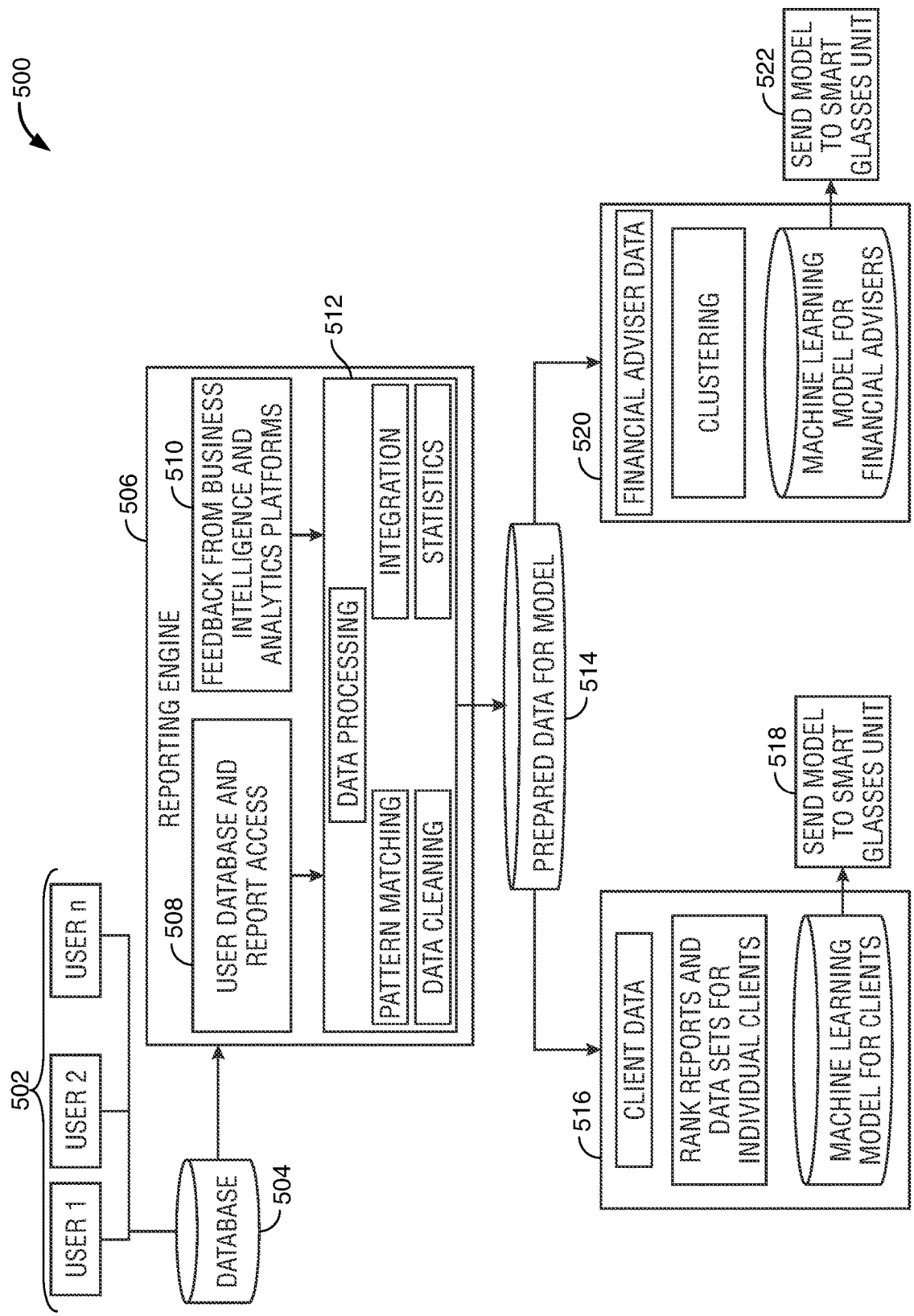
FIG. 5 shows an illustrative process flow in accordance with principles of the disclosure.

FIG. 5 shows training process 500 for developing machine learning models that are personalized for enterprise clients and financial advisors. Process 500 may include one or more features of process 300, shown in FIG. 3. Machine learning models 516 and 520 are shown at step 308 of process 300.

Users 502 may access enterprise database 504. Reporting engine 506 may identify patterns of data usage for a user. At step 508, reporting engine 506 may capture user actions while accessing databases and reports. At step 510, reporting engine 508 may capture user interactions with enterprise business intelligence and analytics platforms. At step 512, data processing may standardize and normalize the data for consistency and uniformity. At step 514, the user data may be stored for input into the machine learning models.

Machine learning model 516 may be trained using client data. The model may be trained to rank reports and/or data sets for individual clients. At step 518, the model may be transmitted to a smart glasses unit, such as smart glasses device 304 shown in process 300.

Machine learning model 520 may be trained using financial advisor data. The model may be trained to rank reports and/or data sets for financial advisors. The model may use clustering algorithms to group reports for multiple clients of a financial advisor based on factors such as age or demographic. At step 522, the model may be transmitted to a smart glasses unit, such as smart glasses device 304 shown in process 300.

Thus, methods and apparatus for an INTELLIGENT INTEGRATED REMOTE REPORTING SYSTEM are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for intelligent integrated remote reporting, the method comprising:
   at an edge device:
     receiving a natural language request from a user for remote generation of a report;
     using a first machine learning model, generating a first ranking comprising a set of existing reports, the first ranking based at least in part on past database activity by the user; and
     displaying the first ranking to the user and receiving an input from the user rejecting the set of existing reports; and
   at an enterprise server:
     in response to rejection of the set of existing reports, mapping the natural language request to one or more data sets;
     using a second machine learning model, generating a second ranking comprising the mapped data sets and one or more additional data sets, the second ranking based at least in part on past database activity by the user, past database activity by a set of enterprise users, and a relationship between a mapped data set and the additional data sets, the past database activity comprising frequency of access, the relationship comprising a relationship between a column in a mapped data set and a column in one of the additional data sets;
     displaying the second ranking to the user and receiving a user selection of one or more of the ranked data sets from the edge device;
     based on user selection of a ranked data set, displaying a set of report schema comprising delivery method, level of aggregation, and column format, and receiving a user selection of displayed report schema from the edge device;
     transmitting a request to an integrated reporting platform in JavaScript Object Notation (JSON) format, the request comprising the selected data set and report schema; and
   using the integrated reporting platform:
     converting the JSON request to executable instructions, the instructions formatted based at least in part on a data structure associated with the selected data set;
     generating a report comprising the selected report schema populated with the selected data set; and
     transmitting feedback associated with the selected data set to update the first machine learning model and the second machine learning model.

2. The method of claim 1, further comprising:
authenticating the user at the edge device; and
based on authentication of the user, identifying a version of the first machine learning model that is personalized for the user.

3. The method of claim 1 further comprising:
generating a mock report based on the selected data sets and the selected report schema, the mock report comprising the report schema and simulated report content;
receiving user approval of the mock report from the edge device; and
generating the report based on the mock report.

4. The method of claim 1, wherein the natural language request is a voice-based request.

5. The method of claim 4, wherein the edge device is a voice-enabled smart glasses device.

6. The method of claim 5, further comprising displaying the ranked data sets on a smart glasses display.

7. The method of claim 5, further comprising receiving user input via a smart glasses input.

8. The method of claim 5, further comprising displaying the generated report to the user via a smart glasses display.

9. The method of claim 1, wherein the executable instructions are first executable instructions for a first data set stored in a first reporting format, the method further comprising converting the JSON request to second executable instructions formatted for a second data set stored in a second reporting format.

10. The method of claim 1, wherein the integrated reporting platform is a wrapper layer that manages access to a plurality of reporting engines.

11. One or more non-transitory computer-readable media storing computer-executable instructions which, when executed by a processor on a computer system, perform a method for intelligent integrated remote reporting, the method comprising:
receiving a natural language request from a user for remote generation of a report at an edge device;
using a first machine learning model, the first machine learning model installed on the edge device, generating a first ranking comprising a set of existing reports, the first ranking based at least in part on past database usage by the user;
displaying the first ranking to the user and receiving an input from the user rejecting the set of existing reports;
using a second machine learning model, the second machine learning model installed on an enterprise server:
mapping the natural language request to one or more data sets; and
generating a second ranking comprising the mapped data sets and one or more additional data sets, the second ranking based at least in part on past database usage by the user, past database usage by a set of enterprise users, and a relationship between a mapped data set and the additional data sets, the past database usage comprising frequency of access, the relationship comprising a relationship between a column in the mapped data set and a column in one of the additional data sets;
displaying the second raking to the user and receiving a user selection of one or more of the ranked data sets from the edge device;
based on user selection of a ranked data set, displaying a set of report schema comprising delivery method, level of aggregation, and column format, and receiving a user selection of displayed report schema from the edge device;
transmitting a request to an integrated reporting platform in JavaScript Object Notation (JSON) format, the request comprising the selected data sets and report parameters;
converting the JSON request to one or more executable instructions, the instructions based at least in part on a data structure associated with the selected data sets;
generating a report comprising the selected data sets; and
transmitting feedback associated with the selected data sets to update the first machine learning model and the second machine learning model.

12. The media of claim 11, further comprising:
authenticating the user at the edge device; and
based on authentication of the user, identifying a version of the first machine learning model that is associated with the user.

13. The media of claim 11, further comprising:
generating a mock report based on the selected data sets and the selected report schema, the mock report comprising the report schema and simulated report content;
receiving user approval of the mock report from the edge device; and
generating the report based on the mock report.

14. The media of claim 11, wherein the natural language request is a voice-based request.

15. The media of claim 14, wherein the edge device is a voice-enabled smart glasses device.

16. The media of claim 11, wherein the executable instruction is a first executable instruction for a first data set stored in a first reporting format, the media further comprising converting the JSON request to a second executable instruction formatted for a second data set stored in a second reporting format.

17. The media of claim 11, wherein the integrated reporting platform is a wrapper layer that controls access to a plurality of reporting engines.

18. A system for intelligent integrated remote reporting, the system comprising:
an edge device configured to:
receive a natural language request from a user for remote generation of a report;
using a first machine learning model, generate a ranked set of existing reports, the ranking based at least in part on past database usage by the user; and
display the ranked set of existing reports to the user;
an interactive report generation module configured to:
in response to the input at the edge device, map the natural language request to one or more data sets;
using a second machine learning model, generate a ranking comprising the mapped data sets and one or more additional data sets, the ranking based at least in part on past database usage by the user, past database usage by a set of enterprise users, and a relationship between a mapped data set and the additional data sets, the usage comprising frequency of access, the relationship comprising a relationship between a column in the mapped data set and a column in one of the additional data sets;
display the ranked data sets to the user and receive a user selection of one or more of the ranked data sets from the edge device;
based on a user selection of a ranked data set, display a set of report schema comprising delivery method, level of aggregation, and column format, and receive a user selection of displayed report schema from the edge device; and
generate a request in JavaScript Object Notation (JSON) format, the request comprising the selected data sets and report parameters; and
an integrated reporting platform configured to:
convert the JSON request to executable instructions, the instructions based at least in part on a data structure associated with the selected data set;
generate a report comprising the selected data set; and
transmit feedback associated with the selected data set to update the first machine learning model and the second machine learning model.

* * * * *